UNITED STATES PATENT OFFICE.

MARIE VIRGINIE PIRON, OF BRUSSELS, BELGIUM, ASSIGNOR TO CARLOS DELATTRE, OF LILLE, FRANCE.

WATERPROOFING AND PRESERVATION OF FABRICS.

SPECIFICATION forming part of Letters Patent No. 339,463, dated April 6, 1886.

Application filed November 23, 1885. Serial No. 183,757. (No specimens.) Patented in Belgium November 6, 1884, No. 66,802, and May 22, 1885, No. 68,977; in France May 26, 1885, No. 169,152, and in England May 28, 1885, No. 6,509.

*To all whom it may concern:*

Be it known that I, MARIE VIRGINIE PIRON, a subject of the King of Belgium, residing at Brussels, in the Kingdom of Belgium, have invented new and useful Improvements relating to the Waterproofing and Preservation of Linen and other Fabrics, Ropes, Hose, and other Articles Composed of Vegetable Substances, of which the following is a specification.

This invention relates to an improved process of rendering fabrics and other materials composed of vegetable substances impermeable and imputrescible.

The said invention is applicable for treating vegetable products generally, and especially linen tent-covers and hose, wood, cordage, ropes, cables, and string coverings for metallic cables and the like.

The said invention has for its object to render vegetable substances impermeable to water, unattackable by acids, and incorruptible—that is to say, incapable of being affected by dry rot, or of decaying, and of being attacked by vegetable or animal ferments.

In order to explain this process, I will describe, as an example, one of the most important applications—viz., the treatment of linen.

In carrying the said process into practice I infuse in hot water at the temperature of 80° centigrade a tincture or extract of a substance which is rich in tannic principles, such as extract of chestnuts, of yellow kino, of acacia-pods, or of black or yellow catechu. When the said extract is completely dissolved, I reduce the density of the liquid, if too great, to from 1° to 2° Baumé. I then steep the linen or other materials to be preserved in this liquid for some minutes until the capillary vessels of the fibrous materials are well filled with the antiseptic substances.

The linen or other materials, after having been dried, are treated in a second bath, composed as follows: (*a*) If it is desired to obtain a black coating, I add to one hundred kilograms of boiled linseed-oil, rendered very siccative by one of the known processes, one hundred kilograms of a color rich in coloring principles deprived of the metallic oxides, and siccative—for example, the black which Ch. Chateau calls in his technology "composition-black," (which, being a waste product in the manufacture of artificial ultramarine or of Prussian blue, has the advantage of being very inexpensive,) or any other black having the same physical or chemical properties; from ten to twenty-five kilograms of the essence of birch-bark, and especially that obtained in the distillation of the white bark of the Russian birch; from six to ten kilograms of a wax melting at a very high temperature—such as the wax obtained from the palm-tree, which melts at 82°, and which has, moreover, the advantage of being much cheaper than ordinary wax—or any other substance having the same physical and chemical properties. (*b*) If the materials to be impregnated are to be made red, I employ, instead of composition-black, light or dark colcothar, or any other red coloring-matter having the same physical and chemical properties. (*c*) If the materials are to have a green color imparted to them, I employ light or dark thin English green coloring-matter.

I proceed in a similar manner for any other shades or colors, always selecting coloring-matters which have the physical and chemical properties of those mentioned above.

The boiled linseed-oil acts both as a vehicle for the color and as a drying agent. The birch-tar has the property of remaining elastic at any temperature, even at 20°, and as neither it nor the wax sticks, tent-cloths prepared in the bath composed as just stated are not liable to stick or break either in hot or cold countries.

In order that the linen articles or materials shall be completely impregnated, the bath in which they are dipped is raised to the temperature of from 100° to 120°. They are then passed either to a press or between two cylinders, in order to press or squeeze out any excess of liquid, leaving between the fibers only the quantity which is absolutely useful. If it is desired to give the articles or materials a better appearance than that which they possess after leaving the press or rollers, they are passed into a cold bath of linseed-oil rendered very siccative. This latter coating must be as thin as possible.

The various operations described can be performed by hand; but the rapidity with which they can be executed is such that nothing prevents them from being performed by mechanical means.

Suitable apparatus is arranged as follows—that is to say: Above a vessel having a double casing is arranged a system of take-off cylinders, and between the two casings of the said vessel steam circulates. In the vessel is the bath into which the linen is dipped. The latter passes between the rollers, which squeeze out the excess of the substance with which the material has been treated, and which the latter has absorbed in the vessel. On leaving the cylinders the linen is drawn along in a continuous drying apparatus, and then wound upon rollers.

The materials treated according to my process are impermeable and imputrescible, and these properties are imparted to them without the other and ordinary qualities of the materials being impaired. They are rendered neither sticky nor brittle, and their fibers maintain all their strength, which is not the case when other coatings are used which are applied only to the surface and do not penetrate the fibers, and the materials are affected in such a manner that after a little time they lose all stiffness.

What I claim is—

1. The process of waterproofing fabrics and other vegetable fibrous and textile articles, consisting in subjecting the same to a hot bath of oil and an antiseptic substance, then drying such articles and subjecting the same to a second bath of oil containing a non-metallic pigment and a ceraceous material, substantially as described.

2. The process of waterproofing fabrics and other vegetable fibrous articles, consisting in subjecting the same to a hot bath of a siccative oil and a tannic substance, then treating the same with a bath of oil containing a non-metallic pigment, essence of birch-bark, and a ceraceous material, substantially as described.

3. A fabric having a water-proof and antiseptic filling and coating of oil, tannic substance, essence of birch-bark, a waxy substance, and a pigment matter, substantially as described.

In testimony whereof I have signed this specification before two subscribing witnesses.

MARIE VIRGINIE PIRON.

Witnesses:
    VICTOR ROGIERS,
*Of 2 Rue des Arquebutiers, at Brussels, Belgium.*
    A. MOORS,
*Of 20 Rue Lafranco, at Brussels, Belgium.*